US012736946B2

(12) United States Patent
Shirley et al.

(10) Patent No.: US 12,736,946 B2
(45) Date of Patent: Sep. 15, 2026

(54) CONSTRAINT COMPLIANCE BY PORES IN CURVED SECTIONS

(71) Applicant: Peridot Print LLC, Palo Alto, CA (US)

(72) Inventors: Nathan Eric Shirley, Vancouver, WA (US); Benjamin David Coughlin, Vancouver, WA (US); Ronnie George Parsons, Portland, OR (US)

(73) Assignee: PERIDOT PRINT LLC, Palo Alto, CA (US)

( * ) Notice: Subject to any disclaimer, the term of this patent is extended or adjusted under 35 U.S.C. 154(b) by 563 days.

(21) Appl. No.: 18/023,363

(22) PCT Filed: Sep. 22, 2020

(86) PCT No.: PCT/US2020/052047
§ 371 (c)(1),
(2) Date: Feb. 26, 2023

(87) PCT Pub. No.: WO2022/066148
PCT Pub. Date: Mar. 31, 2022

(65) Prior Publication Data

US 2023/0305524 A1 Sep. 28, 2023

(51) Int. Cl.
*G05B 19/4099* (2006.01)

(52) U.S. Cl.
CPC .................... *G05B 19/4099* (2013.01); *G05B 2219/49023* (2013.01)

(58) Field of Classification Search
None
See application file for complete search history.

(56) References Cited

U.S. PATENT DOCUMENTS

| | | | | |
|---|---|---|---|---|
| 6,377,865 | B1 | 4/2002 | Edelsbrunner et al. | |
| 7,182,837 | B2 | 2/2007 | Chen et al. | |
| 7,464,574 | B2 | 12/2008 | Durney et al. | |
| 8,579,620 | B2 | 11/2013 | Wu | |
| 10,838,402 | B2 * | 11/2020 | Sims .................. | G05B 19/4207 |
| 11,281,186 | B2 * | 3/2022 | Sims .................. | G05B 19/4207 |

(Continued)

FOREIGN PATENT DOCUMENTS

| | | | |
|---|---|---|---|
| DE | 102018003447 | A1 | 10/2019 |
| GB | 2456502 | A | 7/2009 |

(Continued)

*Primary Examiner* — Jason Lin
(74) *Attorney, Agent, or Firm* — Michael Dryja

(57) ABSTRACT

According to examples, an apparatus may include a processor that may obtain a digital model of an item to be fabricated by a 3D fabrication system. The digital model may include pores or pores are to be added algorithmically to the digital model and the pores traverse a curved section of the digital model. The processor may identify within the digital model, consecutive pores along the curved section that fail to comply with a predefined constraint, in which the predefined constraint may include an inter-pore distance constraint, an inter-pore cross-sectional area constraint, or a combination thereof. The processor may modify the digital model to remove at least some of the identified pores to cause remaining pores along the curved section to comply with the predefined constraint.

14 Claims, 8 Drawing Sheets

(56) References Cited

U.S. PATENT DOCUMENTS

| | | | | |
|---|---|---|---|---|
| 2007/0007699 | A1* | 1/2007 | Rynerson | B33Y 70/00 700/98 |
| 2007/0233298 | A1* | 10/2007 | Heide | G06F 30/00 700/118 |
| 2014/0048971 | A1* | 2/2014 | Mannella | B33Y 30/00 264/129 |
| 2017/0069127 | A1* | 3/2017 | Umetani | G06T 17/00 |
| 2017/0305232 | A1 | 10/2017 | Vorenkamp et al. | |
| 2018/0126649 | A1 | 5/2018 | Romano et al. | |
| 2018/0304546 | A1* | 10/2018 | Hakkaku | B29C 67/00 |
| 2020/0122399 | A1 | 4/2020 | Bigos | |

FOREIGN PATENT DOCUMENTS

| | | | |
|---|---|---|---|
| JP | 2019123985 | A * | 7/2019 |
| WO | 2016/101976 | A1 | 6/2016 |
| WO | 2017/143077 | A1 | 8/2017 |
| WO | 2019/125488 | A1 | 6/2019 |

* cited by examiner

CONSTRAINT COMPLIANCE BY PORES IN CURVED SECTIONS

BACKGROUND

Various types of products may be fabricated from a pulp of material. Particularly, a pulp molding die that includes a main body and a mesh may be immersed in the pulp of material and the material in the pulp may form into the shape of the main body and the mesh. The main body and the mesh may have a desired shape of the product to be formed. The complexity of the shape of the product to be formed depends largely on the accuracy with which the mesh may be crafted. The main body and the mesh may include numerous pores for liquid passage, in which the pores in the mesh may be significantly smaller than the pores in the main body. During formation of the product, a vacuum force may be applied through the pulp molding die which may cause the material in the pulp to be suctioned onto the mesh and form into a shape that matches the shape of the pulp molding die. The material may be removed from the mesh and may be solidified, for example by drying, to have the desired shape.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
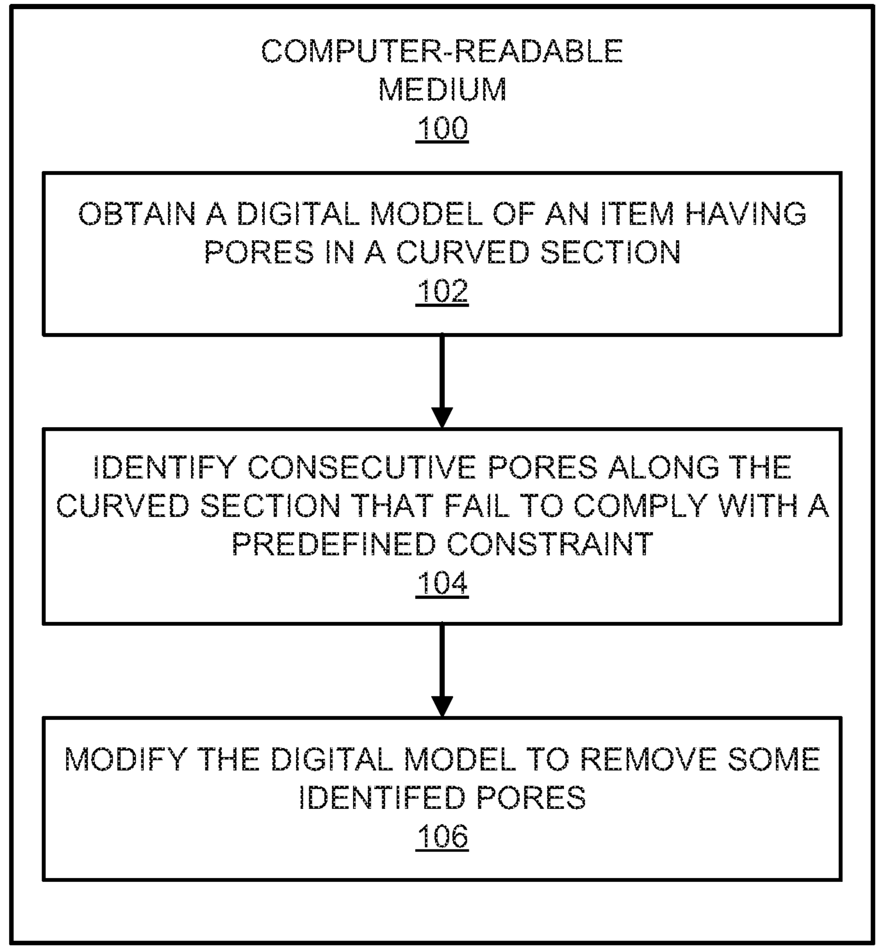
FIG. 1 shows a block diagram of an example computer-readable medium that may have stored thereon computer-readable instructions for modifying a digital model of an item to remove some pores identified as failing to comply with a predefined constraint.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms “a” and “an” are intended to denote at least one of a particular element. As used herein, the term “includes” means includes but not limited to, the term “including” means including but not limited to. The term “based on” means based at least in part on.

Disclosed herein are computer-readable media, methods, and apparatuses that that may identify within a curved section in a digital model of an item to be 3D fabricated, consecutive pores along the curved section that fail to comply with a predefined constraint. The item to be 3D fabricated may be a device in a forming tool and/or a transfer tool, but may also be other types of devices. The forming tool may include a forming mold and a forming screen and the transfer tool may include a transfer mold and a transfer screen. In some examples, the item may be the forming screen, which may be mounted to an existing forming mold. The item may also or alternatively be the transfer screen, which may be mounted to an existing transfer mold. The predefined constraint may include an inter-pore distance constraint, an inter-pore cross-sectional area constraint, or a combination thereof. In addition, based on the identification of the consecutive pores along the curved section that fail to comply with the predefined constraint, the digital model may be modified to remove at least some of the identified pores to cause remaining pores along the curved section to comply with the predefined constraint.

In some instances, pores may be arranged on a flattened version of an item such that the pores are evenly spaced with respect to each other. This may be done as placement of the pores in this manner may be computationally more efficient than placing the pores on the un-flattened version of the item. However, when the item is un-flattened, the even spacing of the pores may result in some of the pores, especially in a curved section, to fail to comply with the predefined constraint.

According to examples disclosed in the present disclosure, a processor may execute a decimation operation to reduce a number of pores at a certain location of the digital model to thus cause the remaining pores comply with the predefined constraint. The certain location of the digital model may be a curved section having a radius of curvature that falls below a certain radius. In one example, the execution of the decimation operation may include both the removal and movement of some of the remaining pores to cause the remaining pores to be positioned at similar distances with respect to each other. In addition, the processor may sequentially execute the decimation operations on multiple portions of the pores, in which the multiple portions of the pores may include portions of the pores that intersect with an inner surface of the curved section, portions of the pores that intersect with an outer surface of the curved section, and portions of the pores that intersect with a central portion of the curved section. By sequentially executing the decimation operations on the multiple portions of the pores, the pores may be arranged such that none of the portions of the pores fail to comply with the predefined constraint.

According to examples disclosed herein, the processor may modify a digital model of an item to be 3D fabricated to remove some pores identified as failing to comply with a predefined constraint and to cause the remaining pores to comply with the predefined constraint. Particularly, the processor may execute a process that may reduce the number of pores in a curved section of the digital model 204 and may increase spaces between the pores in the curved section.

Through implementation of the features of the present disclosure, a processor may execute instructions to remove some of the pores and to move some or all of the remaining pores in a curved section of a digital model of an item to be 3D fabricated such that the remaining pores may comply with a predefined constraint. In one regard, the processor may execute the instructions to check whether an original placement of the pores comply with the predefined constraint, and if not, to take some actions to cause the pores to comply with the predefined constraint. By causing the remaining pores to comply with the predefined constraint, the item may be fabricated according to the modified digital model such that the item may have a reduced number or no areas that may have mechanical strengths that may be below certain levels. As a result, the item may be fabricated to be stronger and more durable, which may extend the life of the item.

A technical issue associated with conventional methods for modeling items with pores may be that the pores in curved sections may come too close to each other as the radius of curvature decreases, resulting in potential points of failures at the curved sections. Similar types of problems may exist if pores are only evaluated across a single surface or the center of the item as, for instance, some portions of the pores may be sufficiently spaced apart from each other while other portions of the pores may be too close to each other. However, conventional methods for modeling of items with pores that do not result in the potential points of failure may be computationally intensive, particularly when there are large numbers, e.g., thousands, tens of thousands, millions, etc., of pores as these methods may require the individual placements of the pores.

Through implementation of the features of the present disclosure to reduce the number of pores and the movement of the remaining pores at a curved section, the pores may be arranged in a digital model through use of a relatively simple layout of pores and the placements of the pores at the curved section may be modified to comply with a predefined constraint. The modification of the pores at the curved section may be computationally less intensive than the conventional methods discussed herein while preventing or eliminating potential points of failure at the curved sections.

Figure 2:
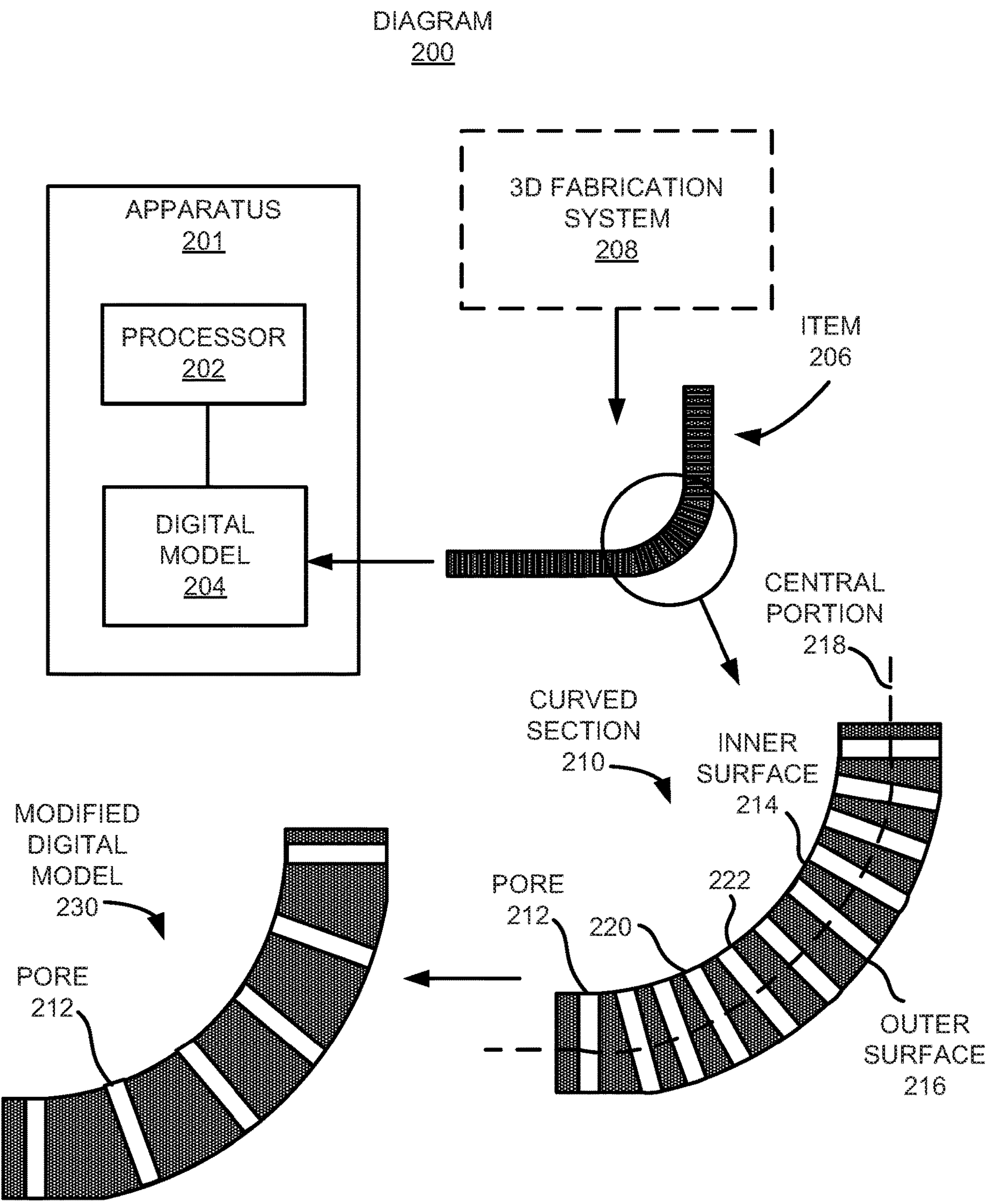
FIG. 2 depicts a diagram, which shows an example processor that may execute the computer-readable instructions stored on the example computer-readable medium on the digital model of the item to generate a modified digital model.
Figure 3A:
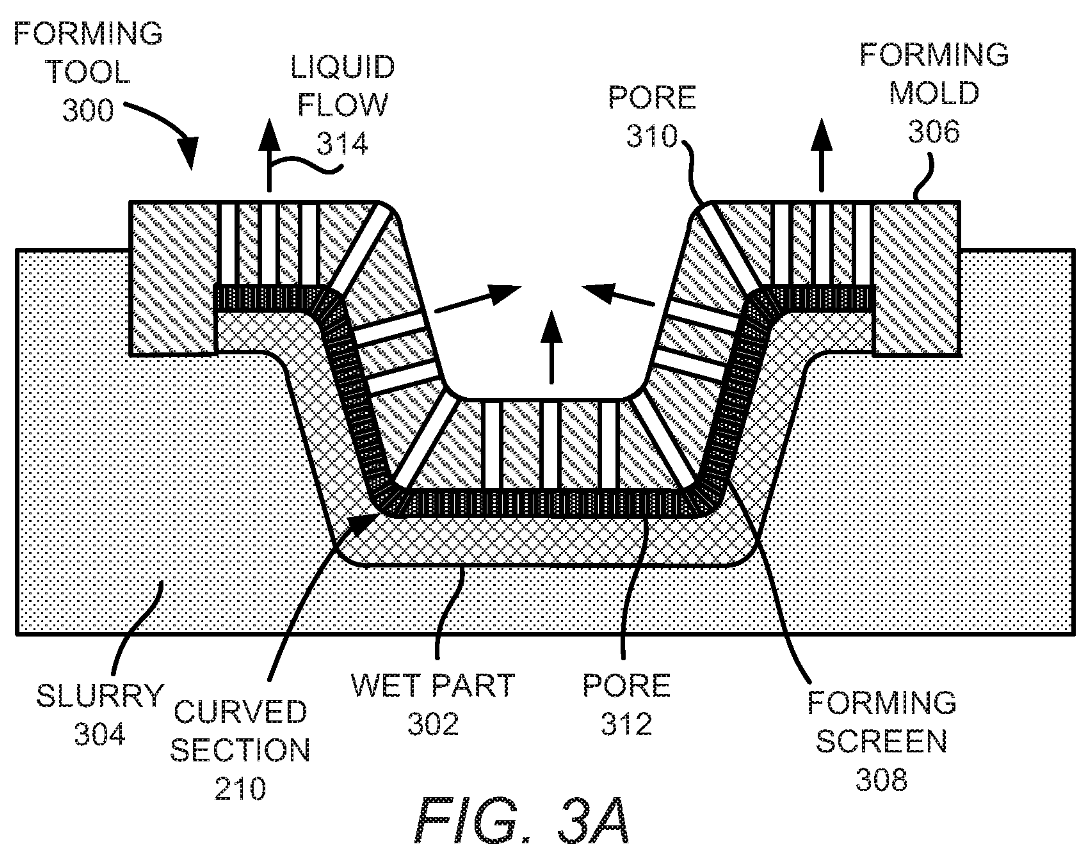
FIGS. 3A and 3B, respectively, depict, cross-sectional side views of example items, in which the example items may include components of an example forming tool and an example transfer tool.
Figure 3B:
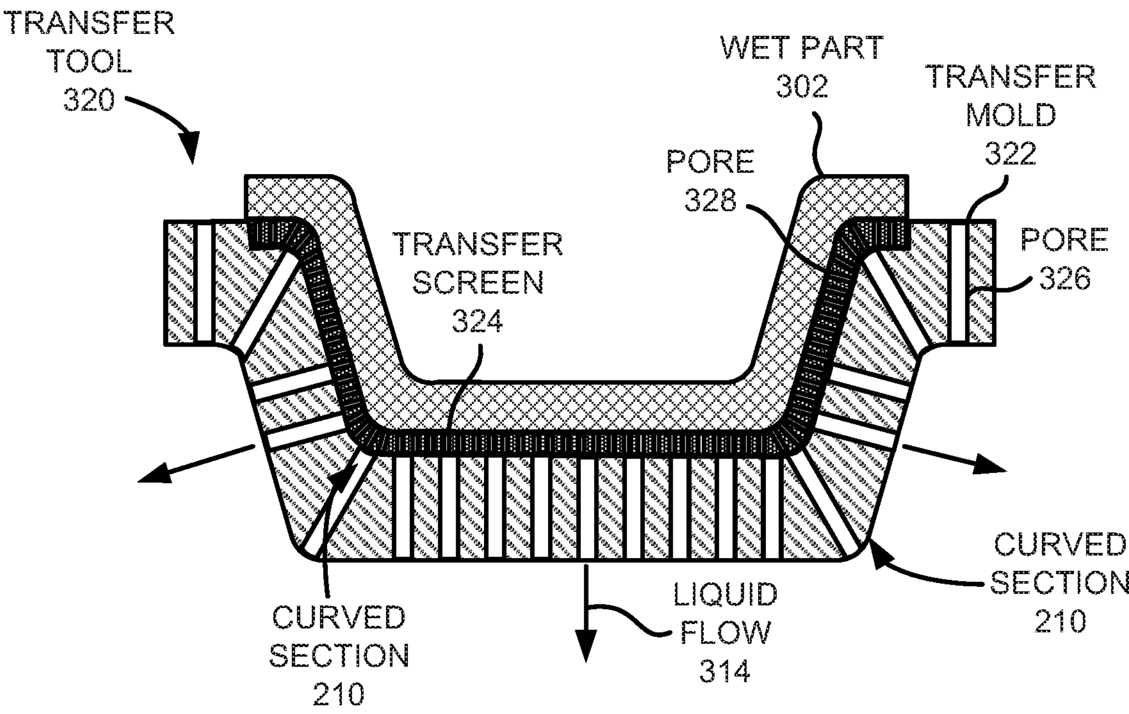

Reference is first made to FIGS. 1, 2, 3A, and 3B. FIG. 1 shows a block diagram of an example computer-readable medium 100 that may have stored thereon computer-readable instructions for modifying a digital model 204 of an item 206 to remove some pores identified as failing to comply with a predefined constraint. FIG. 2 shows a diagram 200, which includes a processor 202 that may execute the computer-readable instructions stored on the example computer-readable medium 100 on the digital model 204 of the item 206 to generate a modified digital model 230. FIGS. 3A and 3B, respectively, depict, cross-sectional side views of example items 206, in which the example items 206 may include components of an example forming tool 300 and an example transfer tool 320. It should be understood that the example computer-readable medium 100 depicted in FIG. 1, the example processor 202 depicted in FIG. 2, and/or the example items 206 depicted in FIGS. 3A and 3B may include additional attributes and that some of the attributes described herein may be removed and/or modified without departing from the scopes of the example computer-readable medium 100, the example processor 202, and/or the example items 206.

The computer-readable medium 100 may have stored thereon computer-readable instructions 102-106 that a processor, such as the processor 202 depicted in FIG. 2, may execute. The computer-readable medium 100 may be an electronic, magnetic, optical, or other physical storage device that contains or stores executable instructions. The computer-readable medium 100 may be, for example, Random Access memory (RAM), an Electrically Erasable Programmable Read-Only Memory (EEPROM), a storage device, an optical disc, and the like. Generally speaking, the computer-readable medium 100 may be a non-transitory computer-readable medium, in which the term "non-transitory" does not encompass transitory propagating signals.

The processor 202 may fetch, decode, and execute the instructions 102 to obtain a digital model 204 of an item 206 to be fabricated by a three-dimensional (3D) fabrication system 208. The digital model 204 of the item 206, may be a 3D computer model of the item 206, such as a computer aided design (CAD) file, or other digital representation of the item 206. In addition, the processor 202 may obtain (or equivalently, access, receive, or the like) the digital model 204 of the item 206 from a data store (not shown) or some other suitable source. In some examples, the digital model 204 of the item 206 may be generated using a CAD program or another suitable design program.

According to examples, and with reference to FIGS. 3A and 3B, the item 206 may be a device that may be employed in the fabrication of a wet part 302 from a slurry 304 of a liquid and material elements. In some examples, the liquid may be water or another type of suitable liquid in which pulp material, e.g., paper, wood, fiber crops, bamboo, or the like, may be mixed into the slurry 304. The material elements may be, for instance, fibers of the pulp material.

FIGS. 3A and 3B respectively show a cross-sectional side view of a forming tool 300, in which a portion of the forming tool 300 has been placed within a volume of the slurry 304, and a cross-sectional side view of a transfer tool 320 that may remove the wet part 302 from the forming screen 308. As shown in FIG. 3A, the forming tool 300 may include a forming mold 306 and a forming screen 308, in which the forming screen 308 may overlay the forming mold 306. As shown in FIG. 3B, the transfer tool 320 may include a transfer mold 322 and a transfer screen 324. The forming tool 300 and the transfer tool 320 may be parts of a machine that is to form molded fiber parts from the slurry 304. As discussed herein, the item 206 may be equivalent to any of the forming screen 308, the forming mold 306, the transfer mold 322, and/or the transfer screen 324. In some examples, however, the transfer tool may not include the transfer screen 324.

In some examples, the forming mold 306 and/or the transfer mold 322 may be removably mounted onto respective supporting structures (not shown) such that, for instance, the forming mold 306 may be moved independently from the transfer mold 322. Moreover, the forming mold 306 and the forming screen 308 may be fabricated to have shapes to which the wet part 302 may be molded when formed on the forming screen 308. Likewise, the transfer mold 322 and the transfer screen 324 may be fabricated to have shapes that may engage multiple surfaces of the wet part 302 formed on the forming screen 308. The transfer screen 324 may have a shape that is complementary to the shape of the forming screen 308.

As shown, the forming mold 306 may be formed to have a relatively larger thickness than the forming screen 308 and the transfer mold 322 may be formed to have a relatively larger thickness than the transfer screen 324. In some examples, the transfer screen 324 and the forming screen 308 may have the same or similar thicknesses and/or the transfer mold 322 and the forming mold 306 may have the same or similar thicknesses. The larger thicknesses of the forming mold 306 and the transfer mold 322 may cause the forming mold 306 and the transfer mold 322 to be substantially more rigid than the forming screen 308 and the transfer screen 324. The forming mold 306 may thus provide structural support for the forming screen 308 and the transfer mold 322 may provide structural support for the transfer screen 324.

In some examples, different versions of the forming screen 308 may be mounted to the forming mold 306 to form wet parts 302 having different details. For instance, a first forming screen 308 may include a first feature that may be imprinted onto the wet part 302 as a first detail and a second forming screen 308 may include a second feature that may be imprinted onto the wet part 302 as a second detail, in which the first detail and the second detail may be 3D logos, predefined embossed textures, embossed text, embossed designs, and/or the like. In this regard, different details may be added to the wet part 302 through the use of different forming screens 308, while using the same forming mold 306, which may simplify the formation of wet parts 302 having various details.

Likewise, different versions of the transfer screen 324 may be mounted to the transfer mold 322 to imprint different details onto a surface (or multiple surfaces) of the wet parts 302. For instance, a first transfer screen 324 may include a first feature that may be imprinted onto the wet part 302 as a first detail when the first transfer screen 324 is engaged with the wet part 302 and a second transfer screen 324 may include a second feature that may be imprinted onto the wet part 302 as a second detail when the second transfer screen 324 is engaged with the wet part 302. The first feature and the second feature may each be a positive, a negative, or a combination of both, relief formed in their respective transfer screens 324. The first detail and the second detail may also include 3D logos, predefined 3D textures, 3D text, 3D designs, and/or the like. In this regard, different details may be formed on the wet part 302 through the use of different transfer screens 324, while using the same transfer mold 322, which may also simplify the formation of wet parts 302 having various details. In some examples, the features on the transfer screen 324 may be complementary versions of features on the forming screen 308 such that, for instance, a common detail may be formed on both opposite surfaces on the wet part 302. In one regard, having such a paired transfer screen 324 and forming screen 308 may help enhance the quality of such details on formed wet parts 302.

The forming mold 306 and/or the forming screen 308 may include a mechanism for the forming screen 308 to be mounted to the forming mold 306. Likewise, the transfer mold 322 and/or the transfer screen 324 may include a mechanism for the transfer screen 324 to be mounted to the transfer mold 322. In either case, the mechanism may include mechanical fasteners, detents, and/or the like to enable the forming screen 308 to be removably mounted onto the forming mold 306 and/or the transfer screen 324 to be removably mounted onto the transfer mold 322. The mechanism that mounts the forming screen 308 to the forming mold 306 and/or that mounts the transfer screen 324 to the transfer mold 322 may be a quick release mechanism to enable the forming screen 308 and/or the transfer screen 324 to easily be released from the respective forming mold 306 and transfer mold 322. This may facilitate replacement of the forming screen 308 and/or the transfer screen 324 for maintenance purposes and/or for screens 308, 324 having different features to be employed in the formation of wet parts 302.

As also shown in FIGS. 3A and 3B, each of the forming mold 306, the forming screen 308, the transfer mold 322, and the transfer screen 324 may include respective pores 310, 312, 326, 328 that may extend completely through respective top and bottom surfaces of the forming mold 306, the forming screen 308, the transfer mold 322, and the transfer screen 324. The pores 312, 328 respectively in the forming screen 308 and the transfer screen may be significantly smaller than the pores 310, 326 respectively in the forming mold 306 and the transfer mold 322. In addition, a plurality of structural features, such as pillars (not shown) may be provided between the surfaces of the forming mold 306 and the forming screen 308 and between the transfer mold 322 and the transfer screen 324 that are respectively adjacent and face each other to enable liquid to flow laterally between the forming mold 306 and the forming screen 308 and between the transfer mold 322 and the transfer screen 324. As some of the pores 312 in the forming screen 308 may not directly align with the pores 310 in the forming mold 306 and some of the pores 328 in the transfer screen 324 may not directly align with the pores 326 in the transfer mold 322, the channels formed by the structural features may enable liquid to flow through those pores 312, 328 in addition to the pores 312, 328 that are directly aligned with the respective pores 310, 326.

Although not shown, the forming tool 300 may be in communication with a plenum to which a vacuum source may connected such that the vacuum source may apply a vacuum pressure through the pores 310, 312. When the vacuum pressure is applied through the pores 310, 312, some of the liquid in the slurry 304 may be suctioned through the pores 310, 312 and may flow into the plenum as denoted by the arrows 314. As the liquid flows through the pores 310, 312, the forming screen 308 may prevent the material elements in the slurry 304 from flowing through the pores 312. That is, the pores 312 may have sufficiently small dimensions, e.g., diameters or widths, that may enable the liquid to flow through the pores 312 while blocking the material elements from flowing through the pores 312. In one regard, the diameters or widths of the pores 312 may be sized based on sizes of the material elements, e.g., fibers, in the slurry 304. By way of particular example, the pores 312 may have diameters of around 0.6 mm. However, in some instances, the pores 312 may have irregular shapes as may occur during 3D fabrication processes.

Over a period of time, which may be a relatively short period of time, e.g., about a few seconds, less than about a minute, less than about five minutes, or the like, the material elements may build up on the forming screen 308. Particularly, the material elements in the slurry 304 may be accumulated and compressed onto the forming screen 308 into the wet part 302. The wet part 302 may take the shape of the forming screen 308. In addition, the thickness and density of the wet part 302 may be affected by the types and/or sizes of the material elements in the slurry 304, the length of time that the vacuum pressure is applied while the forming mold 306 and the forming screen 308 are placed within the volume of the slurry 304, etc. That is, for instance, the longer that the vacuum pressure is applied while the forming mold

306 and the forming screen 308 are partially immersed in the slurry 304, the wet part 302 may be formed to have a greater thickness.

After a predefined period of time, e.g., after the wet part 302 having desired properties has been formed on the forming screen 308, the forming mold 306 and the forming screen 308 may be removed from the volume of slurry 304. For instance, the forming mold 306 may be mounted to a movable mechanism that may move away from the volume of slurry 304. In some examples, the movable mechanism may rotate with respect to the volume such that rotation of the movable mechanism may cause the forming mold 306 and the forming screen 308 to be removed from the volume of slurry 304. In other examples, the movable mechanism may be moved laterally with respect to the volume of slurry 304. As the forming mold 306 and the forming screen 308 are removed from the volume, some of the excess slurry 304 may come off of the wet part 302. However, the wet part 302 may have a relatively high concentration of liquid.

Following the formation of the wet part 302 on the forming screen 308 and movement of the forming screen 308 and the wet part 302 out of the volume of slurry 304, the transfer tool 320 may be moved such that the transfer screen 324 may contact the wet part 302 on the forming screen 308. That is, for instance, the transfer mold 322 may be attached to a movable mechanism (not shown), in which the movable mechanism may cause the transfer mold 306 and the transfer screen 324 to move toward the forming screen 308. In some examples, the transfer tool 320 may be moved to cause the transfer screen 324 to be in contact with the wet part 302 prior to the wet part 302 being de-watered while on the forming screen 308, e.g., within a few seconds of the wet part 302 being removed from the volume of slurry 304. In one regard, the transfer tool 320 may engage the wet part 302 relatively quickly after formation of the wet part 302, which may enable the transfer tool 320 to remove the wet part 302 relatively quickly and the forming tool 300 to be inserted into the volume of slurry 304 to form a next wet part 302.

In addition, the transfer tool 320 may be in communication with a plenum to which a vacuum source may be connected such that the vacuum source may apply a vacuum pressure through the pores 326, 328 while the wet part 302 is in contact with the transfer screen 324. The vacuum source may be the same or a different vacuum source to which the forming tool 300 may be in communication. The vacuum pressure applied through the forming tool 300 may be terminated or reversed (e.g., applied in the opposite direction) while the vacuum pressure is applied through the transfer tool 320. As such, the wet part 302 may be biased toward the transfer tool 320 as opposed to the forming tool 300. While the wet part 302 is biased toward the transfer tool 320, the transfer tool 320 may be moved away from the forming tool 300 such that the transfer tool 320 may remove the wet part 302 from the forming tool 300.

As shown in FIG. 3B, the transfer screen 324 may include pores 328 across multiple surfaces of the transfer screen 324. In some examples, the pores 328 may be positioned deterministically in the transfer screen 324 to cause pressure to be applied substantially evenly across the transfer screen 324 when the vacuum pressure is applied. As a result, pressure may be applied substantially evenly across the surface of the wet part 302 that is in contact with the transfer screen 324. This may prevent the application of increased pressure at a particular location on the surface of the wet part 302, which may prevent the wet part 302 from being damaged by the application of the pressure onto the wet part 302 through the transfer screen 324. Additionally, this may enable the transfer tool 320 to remove wet parts 302 having a vertically or substantially vertically extending (e.g., zero draft) surface (or surfaces) from the forming screen 308 as the pressure may be sufficient to overcome frictional and other forces applied by the forming screen 308 onto the wet part 302.

When the wet part 302 is in contact with the transfer screen 324, the wet part 302 may include some of the liquid from the slurry 304. In addition, when the vacuum pressure is applied through the pores 326, 328, some of the liquid in the wet part 302 may be suctioned through the pores 326, 328 and may flow into the plenum as denoted by the arrows 314. As the liquid flows through the pores 326, 328, the transfer screen 324 may prevent the material elements in the wet part 302 from flowing through the pores 326. That is, the pores 326 may have sufficiently small dimensions, e.g., diameters or widths, that may enable the liquid to flow through the pores 326 while blocking the material elements from flowing through the pores 326. In one regard, the diameters or widths of the pores 312 may be sized based on sizes of the material elements, e.g., fibers, in the slurry 304. By way of particular example, the pores 326 may have diameters of around 0.6 mm or smaller. However, in some instances, the pores 326 may have irregular shapes as may occur during 3D fabrication processes.

In one regard, the application of the vacuum pressure through the pores 326, 328 may de-water the wet part 302 by removing some of the liquid from the wet part 302. As a result, when the wet part 302 undergoes drying, for instance, in an oven, the amount of energy and/or the amount of time to dry the wet part 302 may significantly be reduced.

In another regard, the application of vacuum pressure through the pores 326, 328 may cause the material elements at the surface of the wet part 302 that is contact with the transfer screen 324 to have a greater density than the material elements closer to the center of the wet part 302. As a result, the wet part 302 may resist warpage during drying of the wet part 302, for instance, in an oven, due to a greater level of symmetrical shrinkage afforded by the denser surface matching the similarly dense surface on the forming screen 308 side of the wet part 302. Additionally, the surface may be relatively smoother than when the wet part 302 is allowed to de-water without the application of pressure onto the surface of the wet part 302.

As the liquid flows through the pores 326, 328, the transfer screen 324 the material elements in the wet part 302 may be prevented from flowing through the pores 328. That is, the pores 328 may have sufficiently small dimensions, e.g., diameters or widths, that may enable the liquid to flow through the pores 328 while blocking the material elements from flowing through the pores 328. In one regard, the diameters or widths of the pores 328 may be sized based on sizes of the material elements, e.g., fibers, in the slurry 304.

According to examples, the pores 310, 312 may respectively be positioned in the forming mold 306 and the forming screen 308 and may have properties, e.g., sizes and/or shapes, such that wet part 302 may be formed with predefined characteristics. For instance, the pores 310, 312 may be positioned and may have certain properties to cause the wet part 302 to be formed to have an intended thickness (or thicknesses) throughout the wet part 302. By way of particular example, the pores 310, 312 may be positioned and may have certain properties to cause thicknesses of the wet part 302 to be consistent throughout the wet part 302. As another example, the pores 310, 312 may be positioned and may have certain properties to cause the wet part 302 to be formed without an area having a thickness that is below a certain threshold thickness, e.g., a thickness at which a weak point may be formed in the wet part 302.

According to examples, the pores 326, 238 may respectively be positioned in the transfer mold 322 and the transfer screen 324 and may have properties, e.g., sizes and/or shapes, such that pressure may be applied onto the wet part 302 as described herein. For instance, the pores 326, 328 may be positioned and may have certain properties to cause pressure to be evenly applied across multiple surfaces of the wet part 302. As other examples, the pores 326, 328 may be positioned and may have certain properties to enable sufficient pressure to be applied across the multiple surfaces of the wet part 302 to suction liquid from the wet part 302 without, for instance, damaging the wet part 302.

In some examples, the positions and/or properties of the pores 310, 312, 326, and/or 328 may be determined through implementation of an algorithm that the processor 202 may execute. For instance, the algorithm may be a packing algorithm that may cause a maximum number of pores 310, 312, 326, and/or 328 to respectively be added while causing the forming mold 306, the forming screen 308, the transfer mold 322, and/or the transfer screen 324 to have certain levels of mechanical strength, e.g., to prevent weak points. In this example, the algorithm may be a sphere or ellipsoid packing algorithm or other suitable algorithm for determining placements of the pores 310, 312, 326, and/or 328.

As another example, the algorithm may be a packing algorithm that may position similarly sized pores 310 evenly across the forming mold 306 and/or similarly sized pores 312 evenly across the forming screen 308. In this example, the processor 202 may execute the algorithm to place an array of pores 310 across a flattened version of the forming mold 306 or an array of pores 312 across a flattened version of the forming screen 308. Similarly, the packing algorithm may position similarly sized pores 326 across the transfer mold 322 and/or similarly sized pores 328 across the transfer screen 324. In this example, the processor 202 may execute the algorithm to place an array of pores 326 across a flattened version of the transfer mold 322 or an array of pores 328 across a flattened version of the forming screen 324.

By placing the pores 310, 312, 326, and/or 328 across the flattened versions, the processing resources and/or time consumed to arrange the pores 310, 312, 326, and/or 328 may be reduced as compared with the processing resources and/or time consumed to implement other types of packing algorithms as the other types of packing algorithms may be more computationally intensive than the algorithm of this example. In any regard, following placement of the pores 310, 312, 326, and/or 328, the processor 202 may cause the digital model 204 of the item 206 (e.g., the forming mold 306, the forming screen 308, the transfer mold 322, and/or the transfer screen 324) to include a curved section 210 or multiple curved sections 210.

In any of the examples described herein, the algorithm may cause the pores 310 to be placed with respect to each other such that the pores 310 comply with a predefined constraint with respect to other pores 310. The algorithm may similarly cause the pores 312 to be placed with respect to each other such that the pores 312 comply with a predefined constraint with respect to other pores 312, the pores 326 to be placed with respect to each other such that the pores 326 comply with a predefined constraint with respect to other pores 326, and/or the pores 328 to be placed with respect to each other such that the pores 328 comply with a predefined constraint with respect to other pores 328.

The predefined constraint may be an inter-pore distance constraint, an inter-pore cross-sectional area constraint, a combination thereof, and/or the like. The inter-pore distance constraint may be a constraint that is directed to a minimum distance between adjacent pores. The minimum distance may correspond to a minimum distance at which the material between the adjacent pores may meet a predefined minimum strength level. The inter-pore cross-sectional area constraint may be a constraint that is directed to a minimum cross-sectional area between adjacent pores. The minimum cross-sectional area may correspond to a minimum cross-sectional area at which the material between the adjacent pores may meet a predefined minimum strength level. The inter-pore distance constraint and/or the inter-pore cross-sectional area constraint may be determined based on testing and/or or modeling of various inter-pore distances and/or various inter-pore cross-sectional areas and determining the minimum distance and/or minimum cross-sectional area from results of the testing and/or modeling.

With reference back to FIG. 2, an enlarged version of the curved section 210 in the item 206 is depicted, in which the curved section 210 may include a plurality of pores 212. As discussed herein, the item 206 may represent a portion of any of the forming mold 306, the forming screen 308, the transfer mold 322, and the transfer screen 324 depicted in FIGS. 3A and 3B. In addition, the pores 212 may represent any of the pores 310, 312, 326, and 328 depicted in FIGS. 3A and 3B.

In some instances, such as when the angle of curvature of the curved section 210 falls below a certain angle, some of the pores 212 may violate the predefined constraint. That is, while the digital model 204 of the item 206 was in a flattened state such that the curved section 210 was flat, the pores 212 may have complied with the predefined constraint. However, when the curved section 210 is formed again in the digital model 204, some of the pores 212 in the curved section 210 may violate the predefined constraint as the portions of the pores 212 along the inner surface 214 of the curved section 210 may be relatively closer to each other than the portions of the pores 212 along the outer surface 216 of the curved section. As discussed herein, the processor 202 may remove some of the pores 212 in the curved section 210 and may space the remaining pores 212 to cause the pores 212 in the curved section to meet the predefined constraint.

With particular reference to FIGS. 1 and 2, the processor 202 may fetch, decode, and execute the instructions 104 to identify within the digital model 204, consecutive pores 212 along the curved section 210 that fail to comply with a predefined constraint. As discussed herein, the predefined constraint may include an inter-pore distance constraint, an inter-pore cross-sectional area constraint, a combination thereof, and/or the like. For instance, the processor 202 may identify the locations of the pores 212, which may be represented as points or pores in the digital model 204, and based on the identified locations, may determine if any of the pores 212 fails to comply with the predefined constraint. In making this determination, the processor 202 may identify the locations of certain portions of the pores 212, such as, the portions of the pores 212 that are along the inner surface 214 of the curved section 210, the portions of the pores 212 that are along the outer surface 216 of the curved section 210, and/or the portions of the pores 212 that are along a central portion 218 of the curved section 210. The central portion 218 of the curved section 210 may extend centrally between the inner surface 214 and the outer surface 216 as shown in FIG. 2.

By way of example, the processor 202 may determine that a first pore 220 may fail to comply with the predefined constraint with respect to a second pore 222 and that the second pore 222 may violate the predefined constraint with respect to the first pore 220. The processor 202 may make this determination based on the distances between centers of the pores 220 and 222 along the inner surface 214, the distances between centers of the pores 220 and 222 along the outer surface 216, and/or the distances between centers of the pores 220 and 222 along the central portion 218. In other examples, the processor 202 may make this determination based on the distances between respective edges of the pores 220 and 222. In some examples in which the predefined constraint is an inter-pore constraint, the processor 202 may determine that the first pore 220 and the second pore 222 may violate the inter-pore constraint based on the identified distance between portions of the first pore and the second pore 222. In some examples in which the predefined constraint is an inter-pore cross-sectional area constraint, the processor 202 may determine the cross-sectional area between the first pore 220 and the second pore 222.

The processor 202 may fetch, decode, and execute the instructions 106 to, based on the identification of the consecutive pores 220, 222 along the curved section 210 that fail to comply with the predefined constraint, modify the digital model 204 to remove at least some of the identified pores 220, 222 to cause remaining pores 212 along the curved section 210 to comply with the predefined constraint. Particularly, for instance, the processor 202 may execute a decimation operation on the pores 212 that are identified as failing to comply with the predefined constraint to remove some of the pores 212. In performing the decimation operation, the processor 202 may remove some of the pores 212 (or may combine some of the pores 212) and may move some of the remaining pores 212 to cause distances between the remaining pores 212 to be averaged with respect to each other. That is, the processor 202 may space the remaining pores 212 with respect to each other such that the distances between adjacent ones of the remaining pores 212 are constant with respect to each other. For instance, the processor 202 may space the remaining pores 212 with respect to each other such that the distances of the centers of the remaining pores 212 are the same with respect to each other.

According to examples, the processor 202 may execute the decimation operation on multiple portions of the pores 212 to ensure that each of the pores 212 at the multiple portions comply with the predefined constraint. The multiple portions may include portions that are along the inner surface 214, portions that are along the outer surface 216, and portions that are along the central portion 218 of the curved section 210. That is, for instance, the processor 202 may execute the decimation operation to modify the digital model 204 to remove at least some of the identified pores 212 to cause remaining pores along the curved section 2118 to comply with the predefined constraint following identification of the consecutive pores 212 based on the determined locations at which the consecutive pores intersect with one of the inner surface 214, the outer surface 216, and the central portion 218. By way of example, the processor 202 may execute the decimation operation based on the determined locations at which the consecutive pores intersect with the central portion 218.

In a second execution of the decimation operation, the processor 202 may identify consecutive pores 212 along the curved section 210 that fail to comply with the predefined constraint based on the determined locations at which the consecutive pores 212 intersect with another one of the inner surface 214, the outer surface 216, and the central portion 218. By way of example, the processor 202 may execute the decimation operation based on the determined locations at which the consecutive pores intersect with the outer surface 216. In addition, the processor 202 modify the digital model 204 to remove at least some of the identified pores 212 to cause remaining pores along the curved section 210 to comply with the predefined constraint following identification of the consecutive pores 212 based on the determined locations at which the consecutive pores intersect with the other one of the inner surface 214, the outer surface 216, and the central portion 218 (e.g., the outer surface 216).

In a third execution of the decimation operation, the processor 202 may, following modification of the digital model 204 to remove at least some of the identified pores 212 to cause remaining pores 212 along the curved section 210 to comply with the predefined constraint, identify consecutive pores 212 along the curved section that fail to comply with the predefined constraint based on the determined locations at which the consecutive pores intersect with a last one of the inner surface 214, the outer surface 216, and the central portion 218 (e.g., the inner surface 214).

As shown in FIG. 2, a modified digital model 230 of the item 206 may include a fewer number of pores 212 than the original digital model 204, in which the placements of the pores 212 may comply with the predefined constraint. In addition, the centers of the pores 212, e.g., along the central portion 218, may be averaged with respect to each other.

According to examples, the processor 202 may send the modified digital model 230 to the 3D fabrication system 208, in which the 3D fabrication system 208 is to fabricate the item 206 with the plurality of pores 212 placed in compliance with the predefined constraint. The processor 202 may also send the modified digital model 230 to a controller or processor of the 3D fabrication system 208, which may process or otherwise use the modified digital model 230 to fabricate the item 206. In other examples, the processor 202 may be the controller or processor of the 3D fabrication system 208.

In some examples, the processor 202 may be part of an apparatus 201, which may be a computing system such as a server, a laptop computer, a tablet computer, a desktop computer, or the like. The processor 202 may be a semiconductor-based microprocessor, a central processing unit (CPU), an application specific integrated circuit (ASIC), a field-programmable gate array (FPGA), and/or other suitable hardware device. The apparatus 201 may also include a memory that may have stored thereon computer-readable instructions (which may also be termed computer-readable instructions) that the processor 202 may execute. The memory may be an electronic, magnetic, optical, or other physical storage device that contains or stores executable instructions. The memory may be, for example, Random Access memory (RAM), an Electrically Erasable Programmable Read-Only Memory (EEPROM), a storage device, an optical disc, and the like. The memory, which may also be referred to as a computer-readable storage medium, may be a non-transitory computer-readable storage medium, where the term "non-transitory" does not encompass transitory propagating signals.

The 3D fabrication system 208 may be any suitable type of additive manufacturing system. Examples of suitable additive manufacturing systems may include systems that may employ curable binder jetting onto build materials (e.g., thermally or UV curable binders), ink jetting onto build materials, selective laser sintering, stereolithography, fused deposition modeling, etc. In a particular example, the 3D fabrication system 208 may form the item 206 by binding and/or fusing build material particles together. In any of these examples, the build material particles may be any suitable type of material that may be employed in 3D fabrication processes, such as, a metal, a plastic, a nylon, a ceramic, an alloy, and/or the like. Generally speaking, higher functionality/performance transfer screens 324 may be those with the smallest pore size to block fibers of smaller sizes, and hence some 3D fabrication system technologies may be more suited for generating the transfer screens 324 than others.

Figure 4:
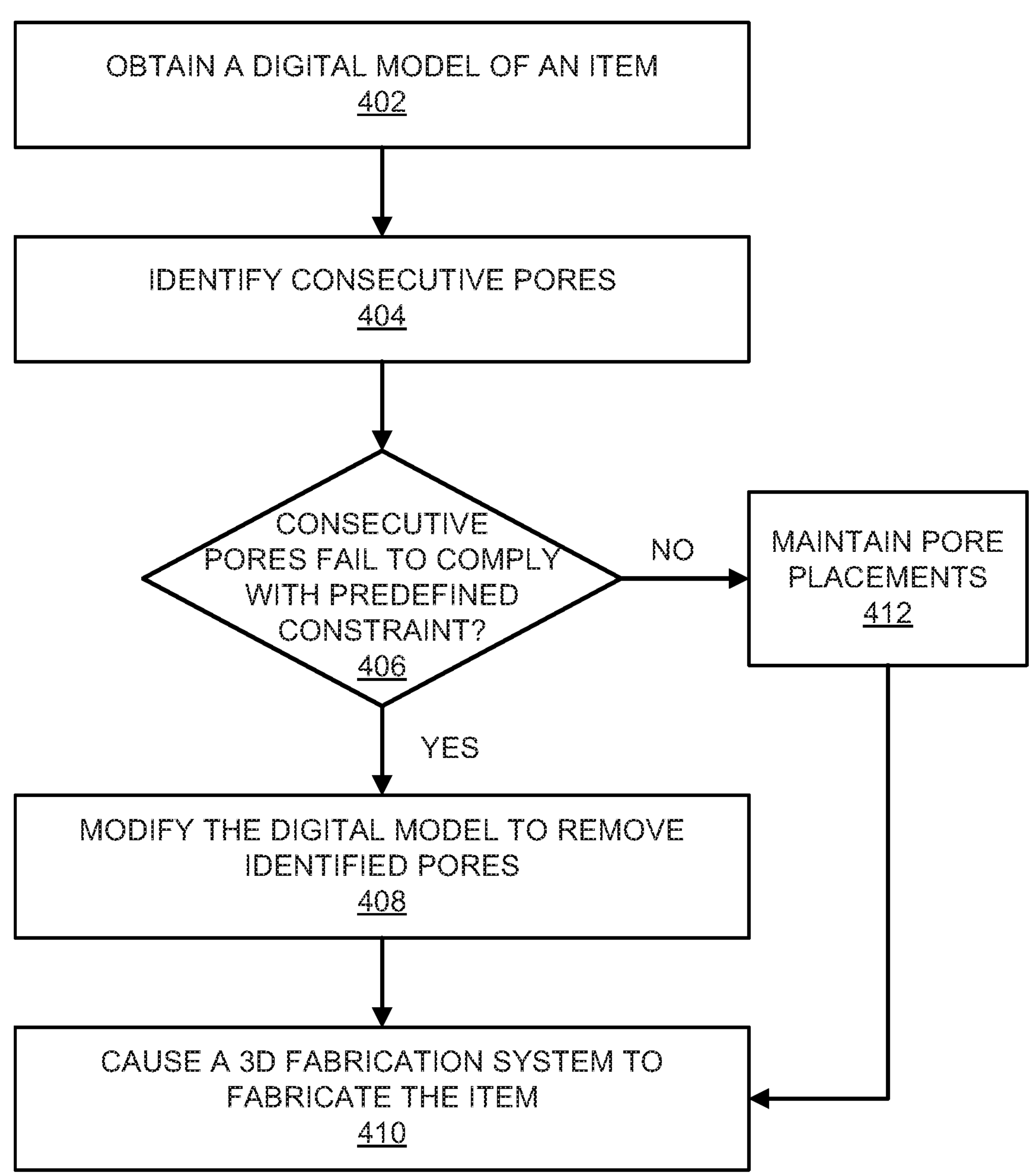
FIG. 4 shows flow diagram of an example method for modifying a digital model of an item to remove some pores identified as failing to comply with a predefined constraint and to cause the remaining pores along the curved section to comply with the predefined constraint.

Turning now to FIG. 4, there is shown a flow diagram of an example method 400 for modifying a digital model 204 of an item 206 to remove some pores 212 identified as failing to comply with a predefined constraint and to cause the remaining pores along the curved section 210 to comply with the predefined constraint. It should be understood that the method 400 depicted in FIG. 4 may include additional operations and that some of the operations described therein may be removed and/or modified without departing from the scope of the method 400. The description of the method 400 is also made with reference to the features depicted in FIGS. 1-3B for purposes of illustration. Particularly, the processor 202 may execute some or all of the operations included in the method 400.

At block 402, the processor 202 may obtain a digital model 204 of an item 206 to be fabricated by a 3D fabrication system 208. As discussed herein, the digital model 204 may include a plurality of pores 212 or a plurality of pores 212 are to be added algorithmically to the digital model 204, in which the pores 212 traverse a curved section 210 of the digital model 204. In addition, at block 404, the processor 202 may identify consecutive pores 212 along the curved section 210 and at block 406, the processor 202 may determine whether any of the consecutive pores 212 fails to comply with a predefined constraint, in which the predefined constraint may include an inter-pore distance constraint, an inter-pore cross-sectional area constraint, a combination thereof, or the like.

At block 408, the processor 202 may, based on at least one of the pores 212 failing to comply with the predefined constraint, modify the digital model 204 to remove at least some of the identified pores 212 to cause remaining pores 212 along the curved section 210 to comply with the predefined constraint. At block 410, the processor 202 may cause a 3D fabrication system 208 to fabricate the item 206 according to the modified digital model 230. The processor 202 may send the modified digital model 230 to the 3D fabrication system 208 and a controller or a processor of the 3D fabrication system 208 may fabricate the item 206 according to the modified digital model 230. In other examples, the processor 202 may be a processor of the 3D fabrication system 208 and the processor 202 may control the 3D fabrication system 208 to fabricate the item 206 according to the modified digital model 230. The fabricated item 206 may be used to form wet parts 302, e.g., molded fiber articles.

As discussed herein, the curved section 210 may include an inner surface 214 and an outer surface 216 and the processor 202 may execute decimation operations on multiple portions of the pores 212 to, for instance, verify that the multiple portions of the pores 212 comply with the predefined constraint. In addition, the processor may identify a central portion 218 of the curved section 210, in which the central portion may extend centrally between the inner surface 214 and the outer surface 216. The processor 202 may also determine locations at which the consecutive pores 212 intersect with the inner surface 214, the outer surface 216, and the central portion 218. In addition, the processor 202 may identify the consecutive pores 212 along the curved section 210 that fail to comply with the predefined constraint based on the determined locations at which the consecutive pores 212 intersect with one of the inner surface 214, the outer surface 216, and the central portion 218.

Following identification of the consecutive pores 212 based on the determined locations at which the consecutive pores 212 intersect with one of the inner surface 214, the outer surface 216, and the central portion 218, and modification of the digital model 204 to remove of at least some of the identified pores, the processor 202 may modify the digital model 204 to move some of the remaining pores 212 to cause distances between the remaining pores 212 to be averaged with respect to each other. Following modification of the digital model to move some of the remaining pores, the processor 202 may identify consecutive pores 212 along the curved section 210 that fail to comply with the predefined constraint based on the determined locations at which the consecutive pores 212 intersect with another one of the inner surface 214, the outer surface 216, and the central portion 218. In addition, the processor 202 may modify the digital model 204 to remove some of the remaining pores 212 and following modification of the digital model 204 to remove some of the remaining pores 212, the processor 202 may modify the digital model 204 to move some of the remaining pores 212 to cause distances between the remaining pores 212 to be averaged with respect to each other.

Following modification of the digital model 204 to move some of the remaining pores 212, the processor 202 may identify the consecutive pores 212 along the curved section 210 that fail to comply with the predefined constraint based on the determined locations at which the consecutive pores 212 intersect with a last one of the inner surface 214, the outer surface 216, and the central portion 218. In addition, the processor 202 may modify the digital model 204 to move some of the remaining pores 212 to cause distances between the remaining pores 212 to be averaged with respect to each other. The processor may cause the 3D fabrication system 208 to fabricate the item 206 based on the modified digital model 204.

With reference back to block 406, based on a determination that the curved section 210 does not include consecutive pores that fail to comply with the predefined constraint, at block 412, the processor 202 may maintain the pore 212 placements. In addition, the processor 202 may cause the 3D fabrication system 208 to fabricate the item 206 based on the digital model 204.

Some or all of the operations set forth in the method 400 may be contained as utilities, programs, or subprograms, in any desired computer accessible medium. In addition, the method 400 may be embodied by computer programs, which may exist in a variety of forms. For example, the method 400 may exist as computer-readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Figure 5:
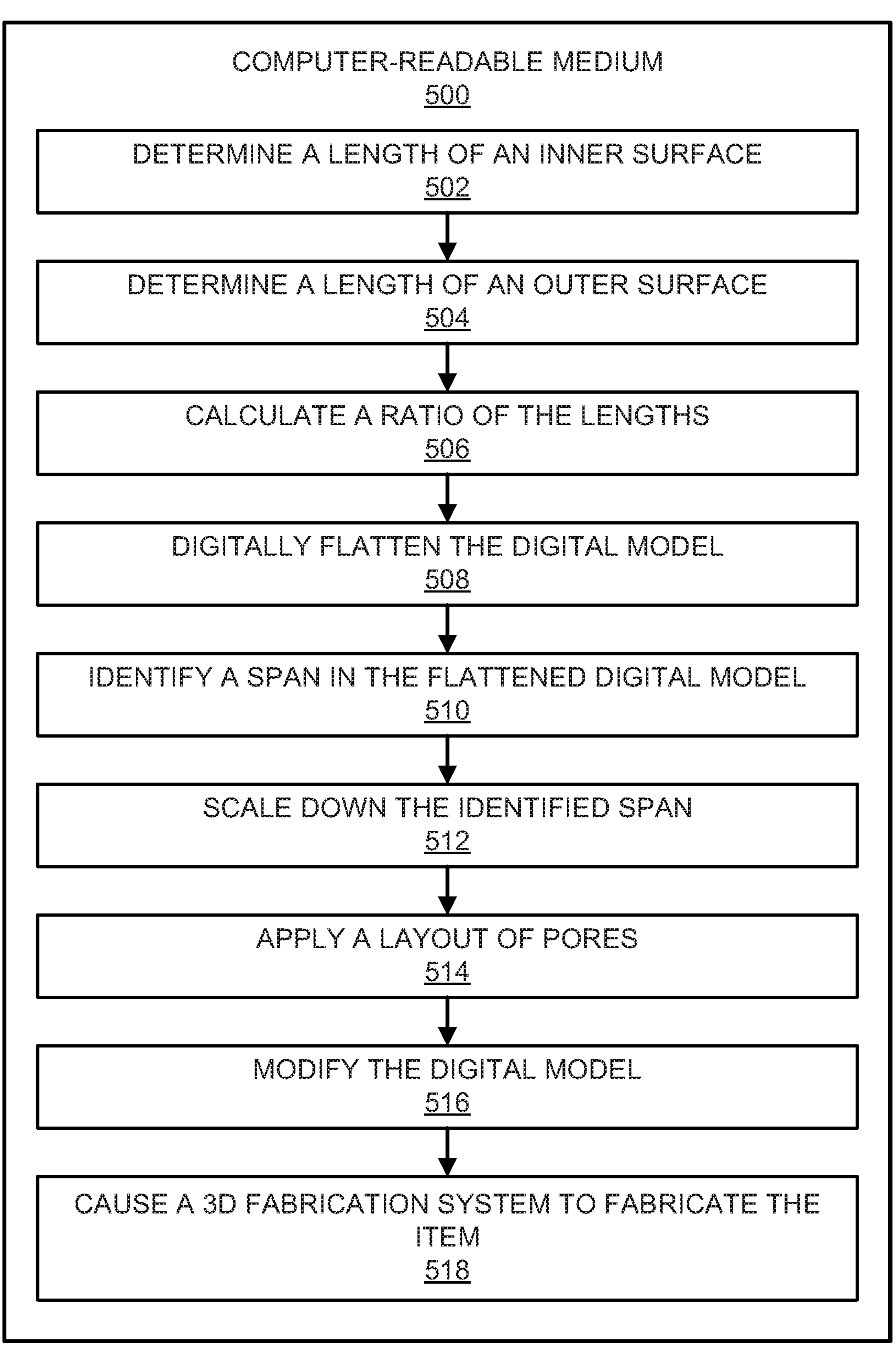
FIG. 5 shows a block diagram of an example computer-readable medium that may have stored thereon computer-readable instructions for modifying a digital model of an item to remove some pores identified as failing to comply with a predefined constraint and to cause the remaining pores to comply with the predefined constraint.
Figure 6:
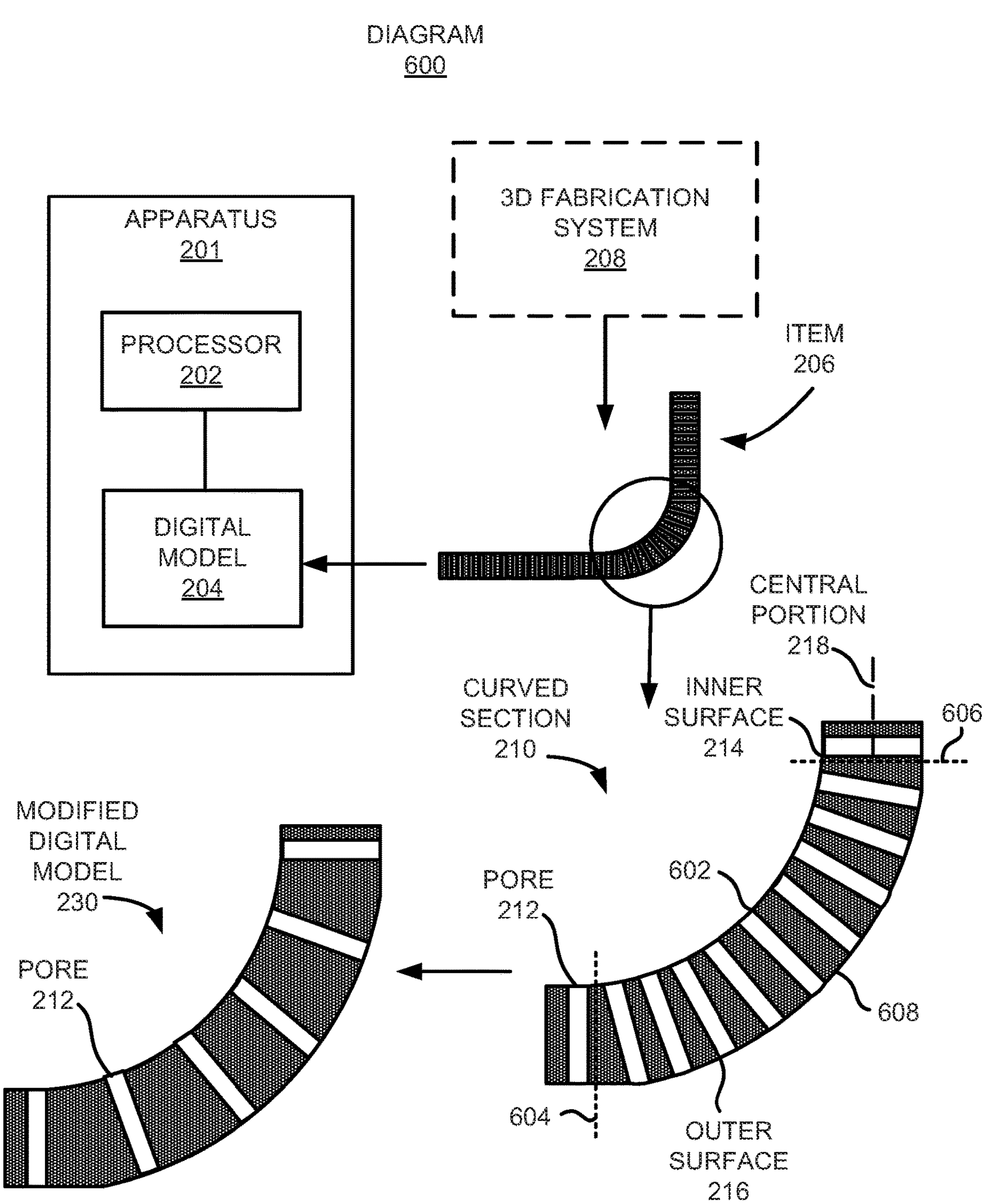
FIG. 6 depicts a diagram, which shows an example processor that may execute the computer-readable instructions stored on the example computer-readable medium depicted in FIG. 5 on the digital model of the item to generate a modified digital model.

Reference is now made to FIGS. 5-7. FIG. 5 shows a block diagram of an example computer-readable medium

500 that may have stored thereon computer-readable instructions for modifying a digital model 204 of an item 206 to remove some pores identified as failing to comply with a predefined constraint and to cause the remaining pores to comply with the predefined constraint. FIG. 6 shows diagram 600, which includes a processor 202 that may execute the computer-readable instructions stored on the computer-readable medium 500 depicted in FIG. 5 on the digital model 204 of the item 206. FIGS. 7A-7D, respectively, depict, diagrams of an example flattened digital model 700 at various stages of processing. It should be understood that the example computer-readable medium 500 depicted in FIG. 5, the example processor 202 depicted in FIG. 6, and/or the example flattened digital model 700 depicted in FIGS. 7A-7D may include additional attributes and that some of the attributes described herein may be removed and/or modified without departing from the scopes of the example computer-readable medium 100, the example processor 202, and/or the example flattened digital model 700.

FIGS. 5-7D include reference numerals that are the same as reference numerals used in FIGS. 1-4. It should be understood that like reference numerals correspond to the same elements in all of the figures. Accordingly, elements corresponding to reference numerals that have previously been described are not described again in detail with respect to FIGS. 5-7D.

The computer-readable medium 500 may have stored thereon computer-readable instructions 502-516 that a processor, such as the processor 202 depicted in FIG. 6, may execute. The computer-readable medium 500 may be an electronic, magnetic, optical, or other physical storage device that contains or stores executable instructions. The computer-readable medium 500 may be, for example, Random Access memory (RAM), an Electrically Erasable Programmable Read-Only Memory (EEPROM), a storage device, an optical disc, and the like. Generally speaking, the computer-readable medium 500 may be a non-transitory computer-readable medium, in which the term “non-transitory” does not encompass transitory propagating signals.

Generally speaking, the processor 202 may execute the instructions 502-516 in instances in which a curved section 210 has a small angle of curvature that may result in some of the pores 212 in the curved section 210 to fail to comply with a predefined constraint. Particularly, the processor 202 may execute the instructions to remove or reduce a number of the pores 212 in the curved section 210 such that the reduced number of the pores 212 may be arranged to comply with the predefined constraint.

The processor 202 may fetch, decode, and execute the instructions 502 to determine a length 602 of an inner surface 214 of a curved section 210 of a digital model 204 of a developable portion of an item 206 to be fabricated by a 3D fabrication system 208. The developable portion of the item 206 may be a portion of the item 206 that includes a single curvature surface that may be digitally unrolled to be flat and then rolled back to its original shape without distortion. In addition, the length 602 of the inner surface 214 may correspond to a distance that extends from a first point that is at an intersection between an initial portion of the curved section 210 as denoted by the dashed line 604 and the inner surface 214 and a second point that is at an intersection between a final portion of the curved section 210 as denoted by the dashed line 606 and the inner surface 214. The initial portion of the curved section 210 may be a portion at which the curved section begins to curve from a flat section and the final portion of the curved section 210 may be a portion at which the curve in the curved section 210 ends.

The processor 202 may fetch, decode, and execute the instructions 504 to determine a length 608 of an outer surface 216 of the curved section 210. The length 608 of the outer surface 216 may correspond to a distance that extends from a first point that is at an intersection between an initial portion of the curved section 210 as denoted by the dashed line 604 and the outer surface 216 and a second point that is at an intersection between a final portion of the curved section 210 as denoted by the dashed line 606 and the outer surface 216.

The processor 202 may fetch, decode, and execute the instructions 506 to calculate a ratio of the length 602 of the inner surface 214 and the length 608 of the outer surface 216.

Figure 7A:
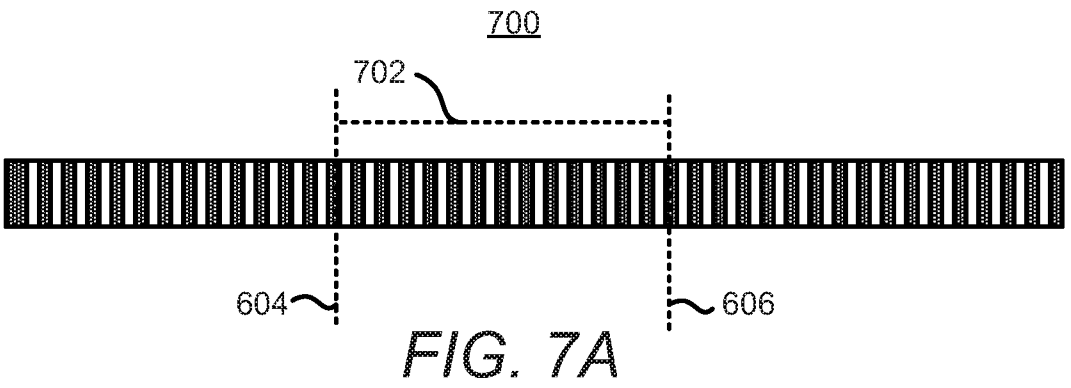
FIGS. 7A-7D, respectively, depict diagrams of an example flattened digital model at various stages of processing.

The processor 202 may fetch, decode, and execute the instructions 508 to digitally flatten the digital model 204 and the instructions 510 to identify a span 702 in the flattened digital model 700 corresponding to the curved section 210. A cross-sectional view of the flattened digital model 700 including the identified span 702 is depicted in FIG. 7A. As shown in FIG. 7A, the span 702 may correspond to the initial portion of the curved section 210 as denoted by the dashed line 604 and the final portion of the curved section 210 as denoted by the dashed line 606.

Figure 7B:
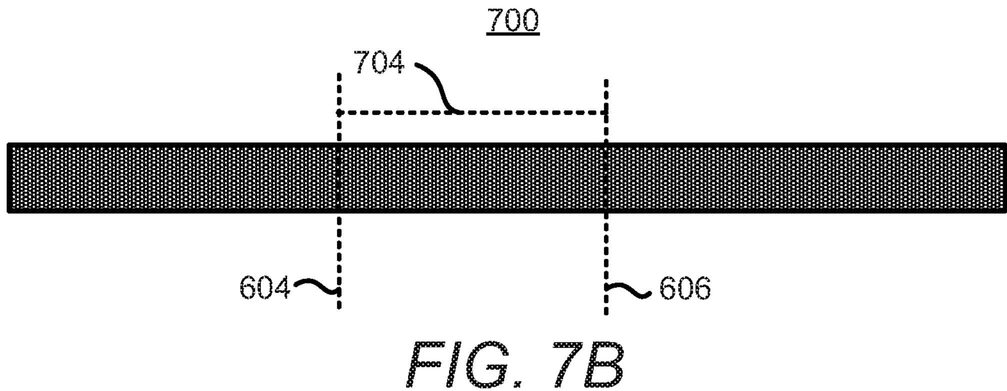
Figure 7C:
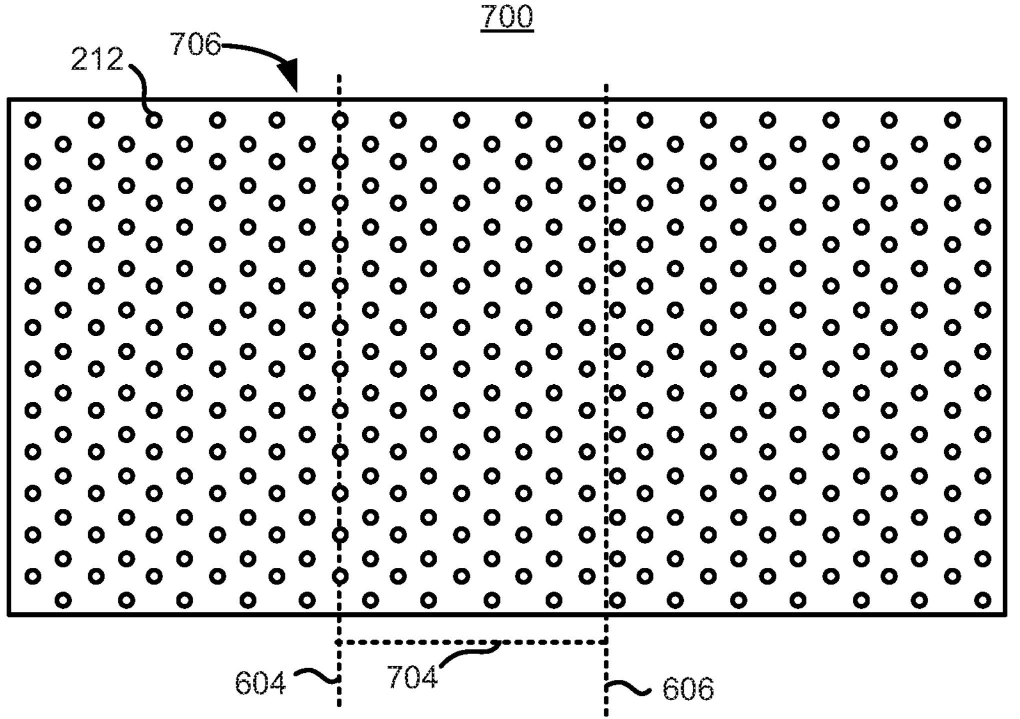

The processor 202 may fetch, decode, and execute the instructions 512 to scale down the identified span 702 in one dimension according to the calculated ratio. That is, for instance, the length of the span 702 may be multiplied by the calculated ratio of the inner surface length 602 to the outer surface length 608. As the calculated ratio is less than one, the length of the span 702 will be reduced as shown in FIG. 7B, which shows a scaled-down span 704. In addition, the length of the span 702 may be reduced in a dimension at which the curved section 210 extends, e.g., perpendicular to the axis about which the curved section 210 is angled. In reducing the length of the span 702, the portions of the flattened digital model 700 outside of the span 702 may not be reduced.

The processor 202 may fetch, decode, and execute the instructions 514 to apply a layout 706 of a plurality of pores 212 across the flattened digital model 700 with the scaled-down span 704. A top view of the flattened digital model 700 with the scaled-down span 704 and the layout 706 of the pores 212 are depicted in FIG. 70. As shown, the layout 706 may include the plurality of pores 212 arranged to be evenly spaced with respect to each other across the flattened digital model 700. In other examples, however, the layout 706 may include other arrangements of pores 212, e.g., sections having different concentrations of pores 212 with respect to each other. In addition, although the layout 706 is depicted as pores 212, the layout 706 may instead depict points, which may be replaced with pores 212 at a later stage.

Figure 7D:
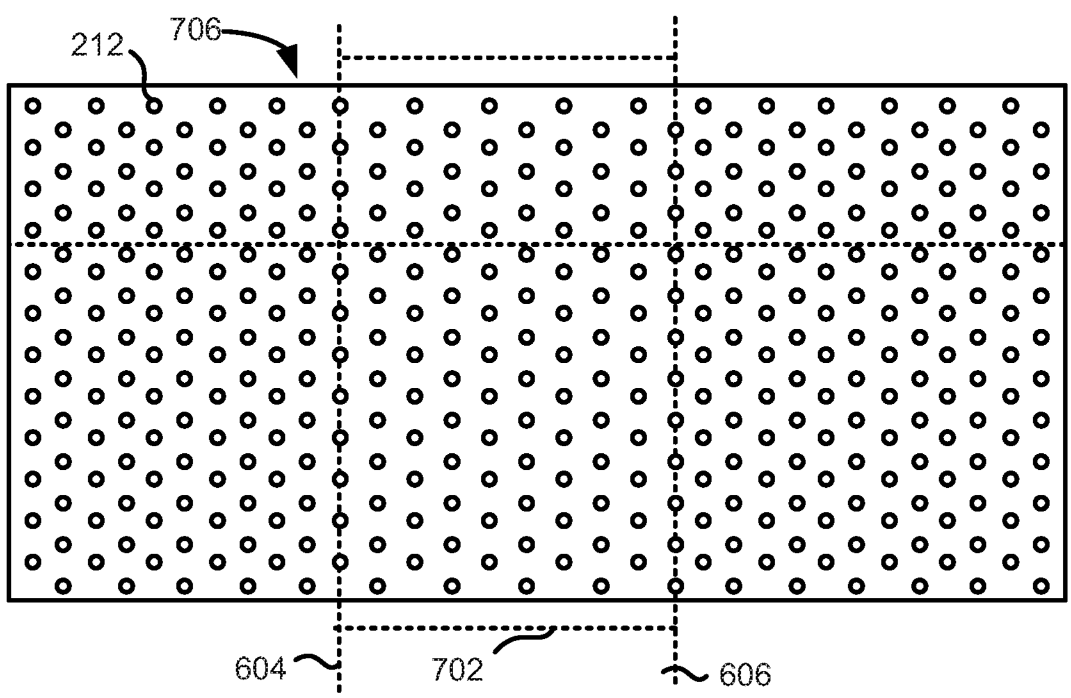

It should be noted that the scaled-down span 704 may include a fewer number of pores 212 than the original span 702 when the layout 706 is overlaid on the flattened digital model 700. In some examples, the processor 202 may return the scaled-down span 704 back to the original size, while maintaining the number of pores 212 as identified in the scaled-down span 704. In addition, the pores 212 in the span 702 with the reduced number of pores 212 may be spaced apart from each other, for instance, such that the pores 212 are evenly spaced apart from neighboring pores 212. As the size of the span 702 may be larger than the scaled-down span 704, the pores 212 in the span 702 may now have greater spacings between the pores 212 as shown in FIG. 7D.

The processor 202 may fetch, decode, and execute the instructions 516 to modify the digital model 204 by providing the applied layout 706 of the plurality of pores 212 on the digital model 204 to cause pores 212 in the curved section 210 to comply with a predefined constraint. That is, the processor 202 may modify the digital model 204 to generate a modified digital model 230 as shown in FIG. 6, in which the modified digital model 230 may include pores 212 that may be spaced further apart from each other than the digital model 204. The processor 202 may digitally roll up the developable portion with the curved section scaled back to an initial size while maintaining a number of pores applied to the scaled down span 704 as shown in FIG. 7D. The modified digital model 230 may be the rolled up version of the flattened digital model 700 depicted in FIG. 7D.

The processor 202 may fetch, decode, and execute the instructions 518 to cause a 3D fabrication system 208 to fabricate the item 206 according to the modified digital model 230. Thus, the processor 202 may cause the item 206, which may, as discussed herein, be a forming mold 306, a forming screen 308, a transfer mold 322, and/or a transfer screen 324, to be fabricated with pores 212 as arranged in the modified digital model 230.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A non-transitory computer-readable medium on which is stored computer-readable instructions that when executed by a processor, cause the processor to:

obtain a digital model of an item to be fabricated by a three-dimensional (3D) fabrication system, wherein either the digital model includes a plurality of pores traversing a curved section of the digital model having inner and outer surfaces, or the digital model is to be processed to add the plurality of pores;

identify a central portion of the curved section extending centrally between the inner and outer surfaces;

determine locations at which consecutive pores along the curved section intersect with the inner and outer surfaces and the central portion;

identify, within the digital model, the consecutive pores that fail to comply with a predefined constraint based on the determined locations, wherein the predefined constraint comprises an inter-pore distance constraint, an inter-pore cross-sectional area constraint, or a combination thereof;

modify the digital model to remove at least some of the identified pores to cause remaining pores along the curved section to comply with the predefined constraint; and cause the 3D fabrication system to fabricate the item in accordance with the modified digital model.

2. The non-transitory computer-readable medium of claim 1, wherein the instructions are further to cause the processor to:

modify the digital model to move some of the remaining pores to cause distances between the remaining pores to be averaged with respect to each other.

3. The non-transitory computer-readable medium of claim 1, wherein identification of the consecutive pores that fail to comply with the predefined constraint includes:

identifying some of the consecutive pores along the curved section that fail to comply with the predefined constraint based on the determined locations at which the consecutive pores intersect with one of the inner and outer surfaces and the central portion.

4. The non-transitory computer-readable medium of claim 3, wherein identification of the consecutive pores that fail to comply with the predefined constraint further includes:

identifying other of the consecutive pores along the curved section that fail to comply with the predefined constraint based on the determined locations at which the consecutive pores intersect with another one of the inner and outer surfaces and the central portion.

5. The non-transitory computer-readable medium of claim 4, wherein identification of the consecutive pores that fail to comply with the predefined constraint further includes:

identifying still other of the consecutive pores along the curved section that fail to comply with the predefined constraint based on the determined locations at which the consecutive pores intersect with a last one of the inner and outer surfaces and the central portion.

6. The non-transitory computer-readable medium of claim 1, wherein causing the 3D fabrication system to fabricate the item in accordance with the modified digital model includes:

sending the modified digital model to the 3D fabrication system.

7. The non-transitory computer-readable medium of claim 1, wherein the item to be fabricated comprises a forming mold, a forming screen for the forming mold, a transfer mold, a transport screen, or a combination thereof.

8. A method comprising:

obtaining, by a processor, a digital model of an item to be fabricated by a three-dimensional (3D) fabrication system, wherein either the digital model includes a plurality of pores traversing a curved section of the digital model having inner and outer surfaces, or the digital model is to be processed to add the plurality of pores;

identifying, by the processor, a central portion of the curved section extending centrally between the inner and outer surfaces;

determining, by the processor, locations at which consecutive pores along the curved section intersect with the inner and outer surfaces and the central portion;

identifying, by the processor and within the digital model, the consecutive pores that fail to comply with a predefined constraint based on the determined locations, wherein the predefined constraint comprises an inter-pore distance constraint, an inter-pore cross-sectional area constraint, or a combination thereof;

modifying, by the processor, the digital model to remove at least some of the identified pores to cause remaining pores along the curved section to comply with the predefined constraint; and causing, by the processor, the 3D fabrication system to fabricate the item in accordance with the modified digital model.

9. The method of claim 8, further comprising:

modifying, by the processor, the digital model to move some of the remaining pores to cause distances between the remaining pores to be averaged with respect to each other.

10. The method of claim 8, wherein identifying the consecutive pores that fail to comply with the predefined constraint includes:

identifying some of the consecutive pores along the curved section that fail to comply with the predefined constraint based on the determined locations at which the consecutive pores intersect with one of the inner and outer surfaces and the central portion.

11. The method of claim 10, wherein identifying the consecutive pores that fail to comply with the predefined constraint further includes:

identifying other of the consecutive pores along the curved section that fail to comply with the predefined constraint based on the determined locations at which the consecutive pores intersect with another one of the inner and outer surfaces and the central portion.

12. The method of claim 11, wherein identifying the consecutive pores that fail to comply with the predefined constraint further includes:

identifying still other of the consecutive pores along the curved section that fail to comply with the predefined constraint based on the determined locations at which the consecutive pores intersect with a last one of the inner and outer surfaces and the central portion.

13. The method of claim 8, wherein causing the 3D fabrication system to fabricate the item in accordance with the modified digital model includes:

sending the modified digital model to the 3D fabrication system.

14. The method of claim 8, wherein the item to be fabricated comprises a forming mold, a forming screen for the forming mold, a transfer mold, a transport screen, or a combination thereof.

* * * * *